Jan. 7, 1969 H. H. WOLFF 3,420,953

APPARENT TARGET MOTION CONTROL

Filed Sept. 20, 1966 Sheet 1 of 5

INVENTOR.

BY HANNS H. WOLFF

INVENTOR.

BY HANNS H. WOLFF

INVENTOR.
BY HANNS H. WOLFF
John M. [signature]

INVENTOR.
BY HANNS H. WOLFF

Jan. 7, 1969 H. H. WOLFF 3,420,953

APPARENT TARGET MOTION CONTROL

Filed Sept. 20, 1966 Sheet 5 of 5

INVENTOR.

BY HANNS H. WOLFF

[signature]

United States Patent Office 3,420,953

Patented Jan. 7, 1969

3,420,953

APPARENT TARGET MOTION CONTROL

Hanns H. Wolff, Orlando, Fla., assignor to the United States of America as represented by the Secretary of the Navy Continuation-in-part of application Ser. No. 535,659, Mar. 14, 1966. This application Sept. 20, 1966, Ser. No. 580,835

U.S. Cl. 178—69.5 8 Claims

Int. Cl. H04l 7/00

The invention described herein may be manufactured and used by or for the Government of the United States of America for governmental purposes without the payment of any royalties thereon or therefor.

This application is a continuation-in-part of application Ser. No. 535,659, filed Mar. 14, 1966.

This invention relates to the art of electronic picture synthesizers and more particularly to a method and apparatus for electronically controlling the apparent relative motion of several combined pictures.

Conventionally, it is possible to achieve relative motion of pictures by mechanically providing relative motion of each individual subject with respect to its individual electronic camera. However it is often inconvenient or impractical to change the physical relationship between the picture (target) and its associated electronic camera, and it becomes desirable to achieve relative motion by electronic means.

In my copending application Ser. No. 535,659, an Electronic Picture Synthesizer is disclosed in which apparent target motion control of individual targets is achieved by biasing line and frame deflection voltage of its electronic camera (Vidicon), respectively to obtain desired horizontal and vertical motion. Such a system, although satisfactory in function, requires relatively high deflection voltages (or currents in the case of a magnetic deflection system) which are often undesirable.

This subject invention has for an object the avoidance of these requirements.

A further object is to provide an improved, compact, reliable and effective system for electronic control of apparent target motion. In the following the terms frame, frame sync pulse, frame sweep voltage, and the like are used throughout. In case of interlaced scanning they should be replaced by the terms field, field sync pulse, field sweep voltage and the like.

In accordance with the subject invention the sweep voltages (line deflection voltages and frame deflection voltages) for the electronic cameras are not derived directly from the corresponding voltages of the display device, as for example a cathode ray tube (CRT), but are controlled by their own sync pulses which in turn are derived by pulse delayers from sync pulse generators which supply the sync pulses for the sweep voltages of the display device. Further features also include fixed delay pulse means for centering channel pictures when the adjustable pulse delay means have delayed the pulse by half a line length or frame height. A still further aspect of the invention relates to range control means for simulation of an apparent change in range of target by coordinated control of the slope of the sweep voltages of both the line and frame sweep generators.

Other objects and advantages will appear from the following description of an example of the invention, and the novel features will be particularly pointed out in the appended claims.

Figure 1:
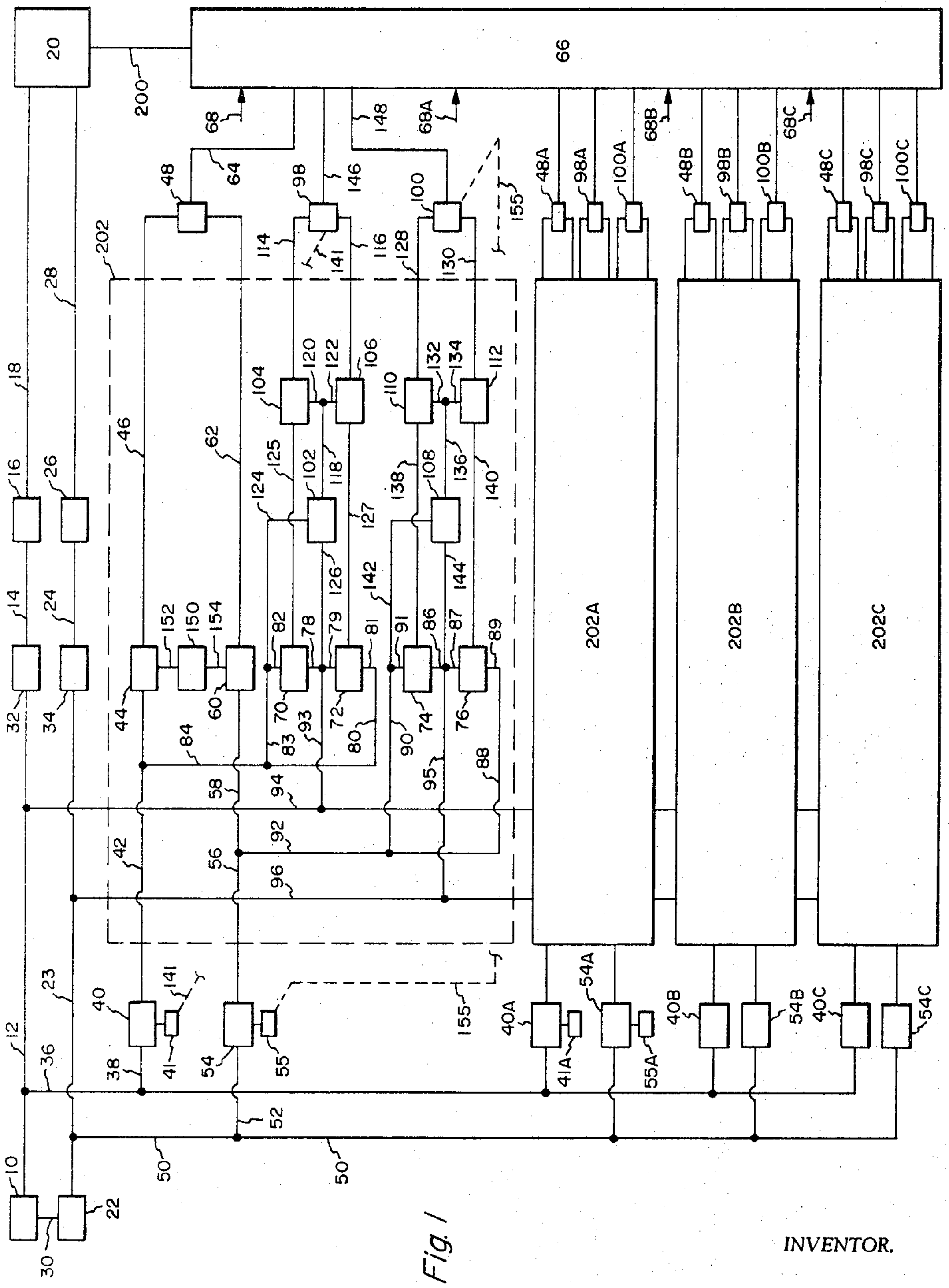
FIG. 1 is a schematic block diagram of an electronic system incorporating the invention.

Referring to FIG. 1 of the drawings, numeral 10 indicates a line sync pulse generator supplying line sync pulses through lines 12 and 14 to a sweep voltage generator 16, which in turn, through line 18 feeds the line deflection system of a display device 20, for example a cathode ray tube (CRT) (not shown). A frame sync pulse generator 22 is provided to supply, through lines 23 and 24, frame sync pulses to control a frame sweep generator 26, which in turn through a line 28 feeds the frame (vertical) deflection system of the display device 20.

The sync generators 10 and 22 for the line and frame sync pulse are linked to each other in conventional manner as indicated by line 30 to assure the necessary time relationship between these two series of pulses. Connected between the lines 12 and 14, and 23 and 24 are provided pulse delay means 32 and 34, respectively, and the function of each will be discussed hereafter.

In accordance with this invention, the line sync pulses from the generator 10 through lines 36 and 38 also feed a line sync pulse delayer 40, which delays the sync line pulses thereafter fed through a line 42 to a line sweep generator 44 in a manner controlled by manual or electronic control means 41. The line sweep voltage generated by the line sweep generator 44 is supplied through a line 46 to the line deflection system of an electronic camera, for example Vidicon 48.

In like manner, a similar system is linked between the frame sync pulse generator 22 and the electronic camera 48. Thus, the frame sync pulse generated by the frame sync pulse generator 22 is supplied through lines 50 and 52 into a frame sync pulse delayer 54. The latter delays the frame sync pulses in a manner controlled by manual or electronic control means indicated at 55. The delayed sync pulses from delayer 54 are passed through lines 56 and 58 to control a frame sweep voltage generator 60, which through line 62 feeds the frame (vertical) deflection system of the electronic camera 48. The Vidicon signals originated by the camera 48 are supplied through a line 64 into a synthesizer system indicated by block 66, one example of such synthesizer system being described in my above mentioned copending application, Ser. No. 535,659. The synthesizer system 66, which is designed to avoid overlapping of video signals receives controlling signals as described in detail in the above mentioned copending application through control lines symbolized by input 68.

Since a shifting of the sync pulses for a picture channel (electronic camera) with respect to the sync pulses for the display system would simply move the starting lines (horizontal and vertical) of the inserted picture with respect to the starting lines of the display and thereby simply split the inserted picture and present an undesired part on the opposite side of the display, one side (horizontal) and one side (vertical) has to be inhibited in the video channel thereby generating an apparent motion to the left or to the right and downwards or upwards.

To achieve this function, two pairs of flip-flop circuits are provided for each channel, one pair 70 and 72 in the line sweep system and one pair 74 and 76 in the frame sweep system. The flip-flops 70 and 72 are interconnected by line 78–79 and are connected through lines 93 and 94 to the output line 12 of the line sync pulse generator 10. The opposite side of the flip-flops 70 and 72 are connected by lines 80 and 83 through line 84 to the output line 42 of the sync pulse delayer 40. Flip-flops 74 and 76 are interconnected by line 86–87 which latter are connected by lines 95–96 to the output line 23 of the frame sync pulse generator 22. The opposite sides of the flip-flops 74 and 76 are connected respectively by lines 90–91 and 88–89 through line 92 to the output line 56 of the sync pulse delayer 54. These flip-flop circuits thus are designed to release a pulse from the moment a starting pulse is applied to the moment a stopping pulse is applied. Each of the pairs is arranged such that in one case the main pulse is used as a starting pulse and the delay pulse is used as a stop pulse. In the second case a reverse arrangement is made. One of these flip-flop circuits therefore supplies a pulse between the main pulse and the delayed pulse, which pulse can be used to inhibit the corresponding video signal entering the synthesizer system 66 or to release the video signal to enter the synthesizer system 66.

To control the motion of the picture to the left or to the right, a switching system 98 is provided connected to the output side of the flip-flop circuit 70–72 through lines 114 and 116. To control the motion of the picture upwards and downwards depending on the selected inhibitors or release pulses a corresponding switching system 100 is provided connected to the output side of the flip-flop circuit 74–76 through lines 128 and 130. Further, to assure a smooth transition at the point where both pulses, main pulses and delayed pulse are partially or totally overlapping, an AND circuit 102 is provided which in combination with two OR circuits 104 and 106 assures smooth transition from the left motion to the right motion. A corresponding set of AND and OR circuits consisting of an AND circuit 108 and two OR circuits 110 and 112 is provided in the frame pulse system to assure a smooth transition from an upwards to the downwards and reverse transition of motion. Thus, the OR circuits 104 and 106 are connected to the switching system 98 respectively by the lines 114 and 116. The OR circuits 104 and 106 are supplied from the AND circuit 102 through lines 118, 120 and 122. The AND circuit 102 is energized through line 124 connected through line 83 to line 84, the latter deriving its supply from the sync pulse delayer 40 and through a line 126 and line 93 from a line 94 deriving its supply from sync pulse generator 10. The OR circuits 104 and 106 are connected respectively through lines 125 and 127 to flip-flops 70 and 72. In a similar manner, the switching system 100 is connected through lines 128 through 144 as shown to the output of the sync pulse delayer 54 and to the output of the sync pulse generator 22. The outputs of the switching systems 98 and 100 are connected respectively by lines 146 and 148 to the synthesizer 66.

The controls 41 and 55 may contain for control purposes either manually controlled or computer controlled potentiometers, which define the target position and are linked to single-pole double-throw switches in the switching circuits 98 and 100, as symbolized by dashed lines 141 and 155. The linkage between the potentiometer control arms and the switches is such that the switches are flipped when their two pulse series (in case of switch 98 the two line pulse series, in case of switch 100 the two frame pulse series) move into coincidence. They flip also a second time when the delay is reversed within the sync pulse coincidence interval. For a simple motion control (control of pulse delayers 40 and 54) it may be desirable to have the channel pictures centered in the display device when the variable pulse delayer control is at its center position. This can be achieved by introducing a fixed delay 32 in the line 12 and providing the variable pulse delayer 40 with a variable delay range between 0 and 2 full line periods. Correspondingly, a fixed delay 34 in line 23 of the frame pulse channel can be provided which may provide a fixed delay of 2 full frame periods. The variable pulse delayer 54 of the frame sync pulse channel can be adjusted over a range from 0 to 2 frame sync pulse periods.

Figure 3:
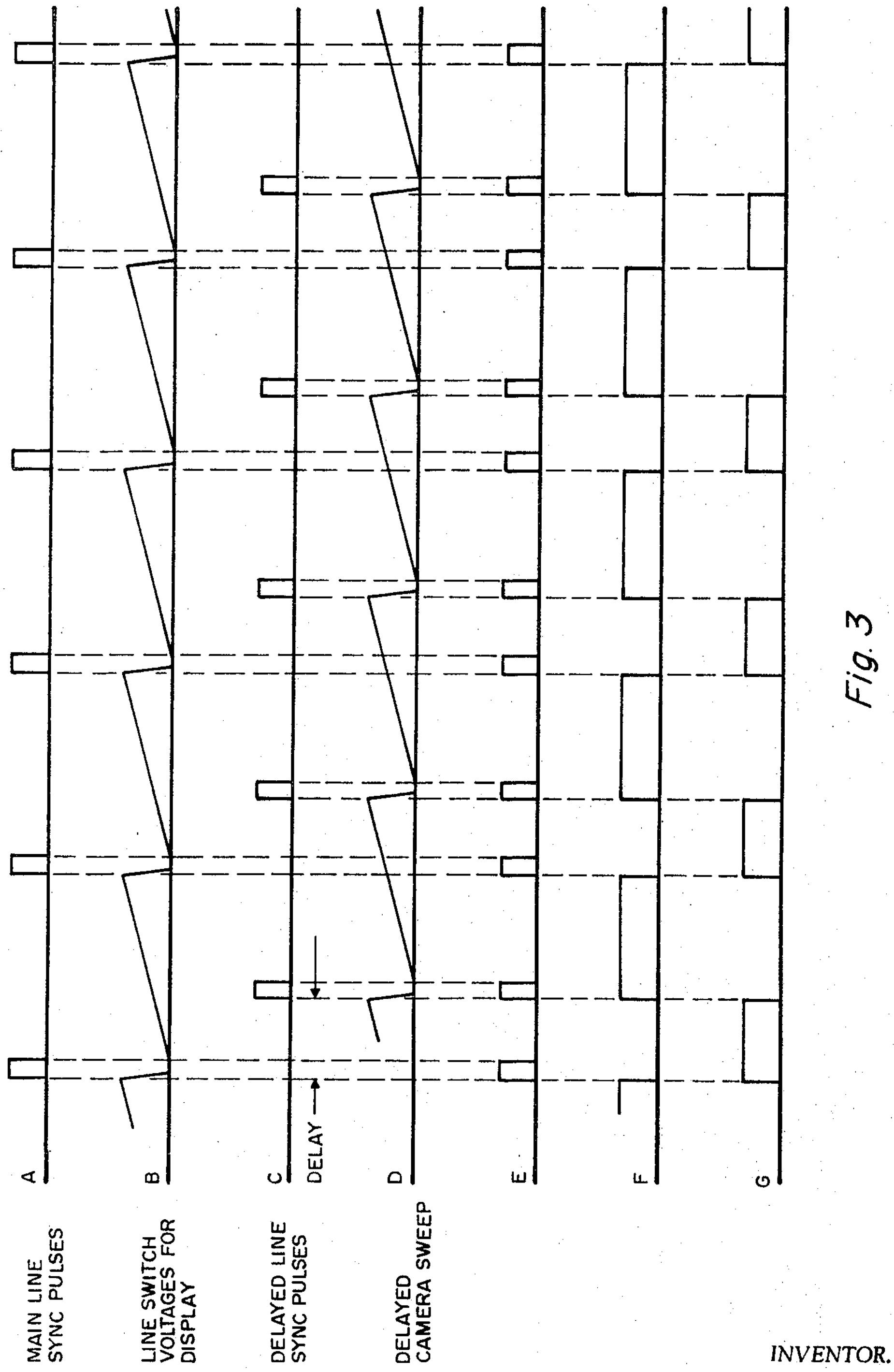
FIG. 3 is a series of pulse charts employed to explain the operation of the circuit in FIG. 1.

The time sequence of the different line pulses, line sweep voltages and the video line inhibitor and/or release pulses is shown in FIG. 3 for the embodiment of this invention as shown in FIG. 1 without the use of the optional fixed delay devices 32 and 34 and without the use of a range control 150 shown connected by lines 152 and 154 to the line sweep voltage generator 44 and the frame sweep voltage generator 60 respectively. The function of the range control 150 will be described in detail hereinafter.

Referring to FIG. 3, the time sequesce of the main line sync pulses for the delay system 20 is shown on time axis A. The line sweep voltages for the display system 20 which are controlled by the main line sync pulses are shown on time axis B. Time axis C shows a delayed line sync pulse sequence for the camera of one of the channels. The line sweep voltages for this channel camera which are controlled by the delayed line sync pulse (time axis C) are shown on time axis D. The video release and inhibitor pulses respectively, that is, the main line sync pulses and the delayed line sync pulses are shown on time axis E. The time axes F and G show the video control pulses derived from the pulses shown on time axis E by means of the flip-flop circuits 70 and 72. One circuit is used for the apparent motion for the left and the other for the apparent motion for the right. Each are used either to inhibit the video signals from being processed in the synthesizer system 66 or to release the signals for processing in the synthesizer system.

The sytem decribed in relation to FIG. 1 lends itself readily to the simulation of an apparent change in range. To control the apparent range, a range control 150 is provided and is connected as previously indicated by lines 152 and 154 respectively to the line sweep generator 44 and frame sweep generator 60. The range control 150 controls the slope of both the line sweep generator 44 and the frame sweep generator 60. To avoid a distortion in the picture, the rang econtrol 150 is arranged as hereinafter described to assure that the ratio of the two voltage slopes is maintained constant.

Figure 2:
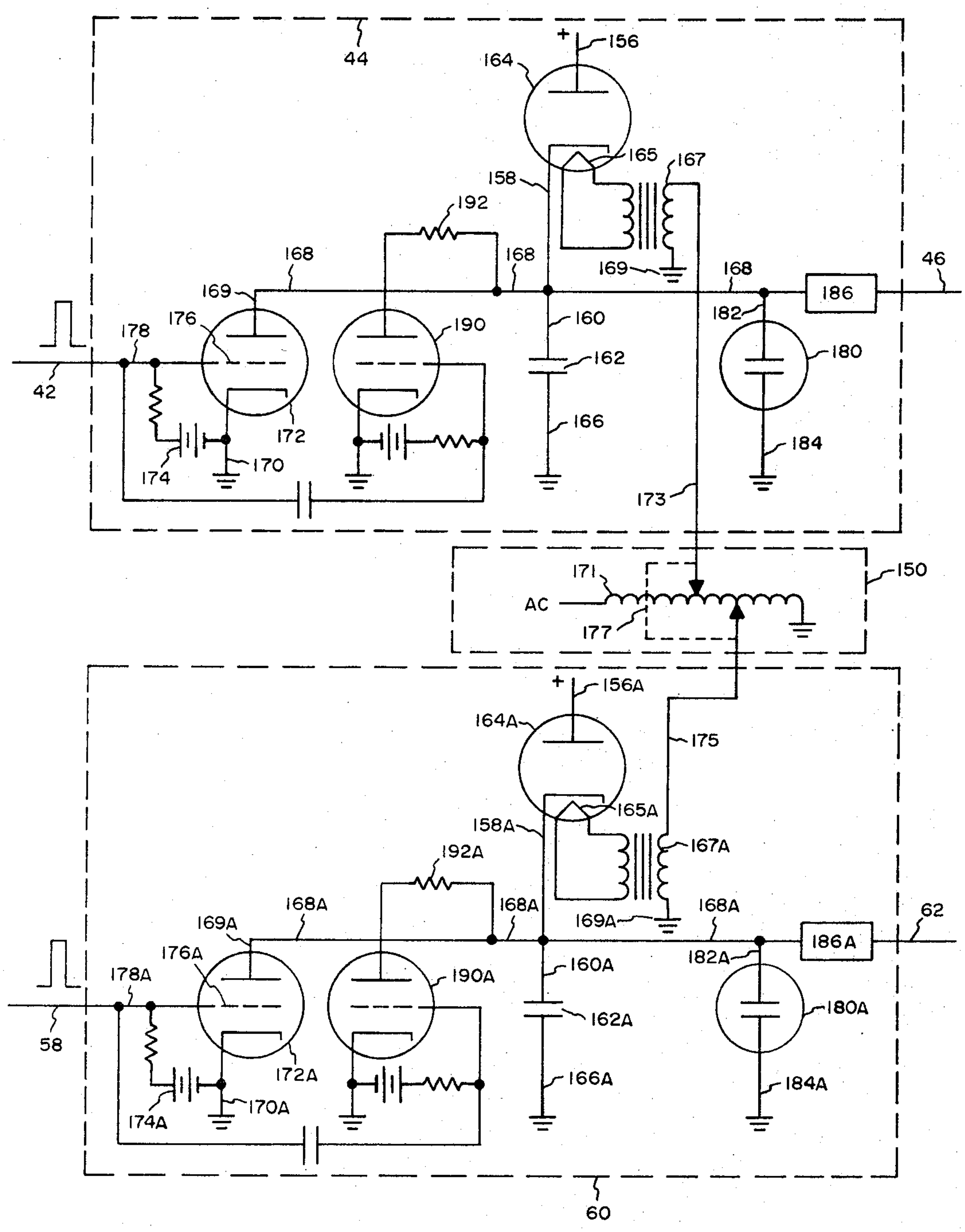
FIG. 2 is a detail circuit diagram of a range control means and associated frame sweep voltage generator circuits employed in the circuit of FIG. 1.

FIG. 2 illustrates one suitable embodiment of the line and frame sweep voltage generators 44 and 60 and the range control 150. As shown in FIG. 2, in relation to the line sweep voltage generator 44, a DC source (not shown) is connected by lines 156, 158 and 160 to a capacitor 162 through a tungsten cathode tube 164. The opposite side of the capacitor being connected through a line 166 to a ground indicated. Connected in parallel with the capacitor 162 by lines 168, 169 and 170 is provided a discharge tube 172 which is biased by a suitable means such as a battery 174 to a non-conducting condition. The sync pulse series indicated is applied via line 42 to the control grid 176 of the tube 172 through a line 178 and actuates the tube 172 to a highly conductive condition and thereby discharges the capacitor 162. The discharge tube 172 is selected such that the capacitor 162 is substantially completely discharged during the period of the sync pulse. A voltage limiting device tube 180 is connected between line 168 and ground indicated by lines 182 and 184 and thus in parallel with the capacitor 162 to thereby control the maximum voltage to which the capacitor 162 can be charged. The maximum charge is selected to be equal to the total sweep voltage required for the electronic camera. The capacitor voltage is applied to a sweep voltage amplifier 186, of for example the push-pull amplifier type, which in turn feeds its output sweep voltage through line 46 to the deflection system of the electronic camera 48.

Tungsten cathode tube 164 is made adjustable by means of a heating element 165 supplied with electrical current from a transformer 167 grounded as at 169. Transformer 167 is controlled from the range control device 150 as will be described. Adjustment means is provided for the tube 164 to allow a change in time constant of the charging circuit and thereby a change in the slope of the saw tooth voltage generated by the charging circuit comprising the tungsten cathode tube 164 and capacitor 162.

To assure a good discharge of capacitor 162 a thyratron tube 190 is preferably provided connected in parallel to the high vacuum discharge tube 172 as indicated. In this manner discharge tube 172 assures an early start of the discharge current, whereas thyratron tube 190 assures a continuation of the discharge to a low voltage when the plate voltage at the discharge tube 176 has already dropped to a low value. A resistor 192 is connected between the line 168 and the thyratron tube 190 as a protective resistance.

Such a range control system must be provided in both the horizontal and vertical deflection systems for the electronic cameras and both circuits must be designed such that the proportionality between the slope for the line sweep voltage and the slope for the frame sweep voltage is maintained when a slope change is effected. Thus the frame sweep voltage generator 60 includes the same elements identified by the same numbers with the suffix *a* after each.

Considering now the range control device 150 there is provided therein a variable tap transformer 171 having tap lines 173 and 175 connected respectively to the heating means of the tungsten cathode tubes 164 and **164*a* of the generators 44 and 60. Tap lines 173 and 175 are gang operated by connecting means indicated at 177. It is also possible in the circuits 44 and 60 to use in the place of the tungsten cathode tube 164 and the capacitor 162 a resistor and capacitor with one or both made variable preferably in gang operation. The resistor and/or capacitor of the line voltage generator 44 have to be ganged with the corresponding components of the frame voltage generator 60** to assure proportionality of both saw tooth slopes.

Figure 4:
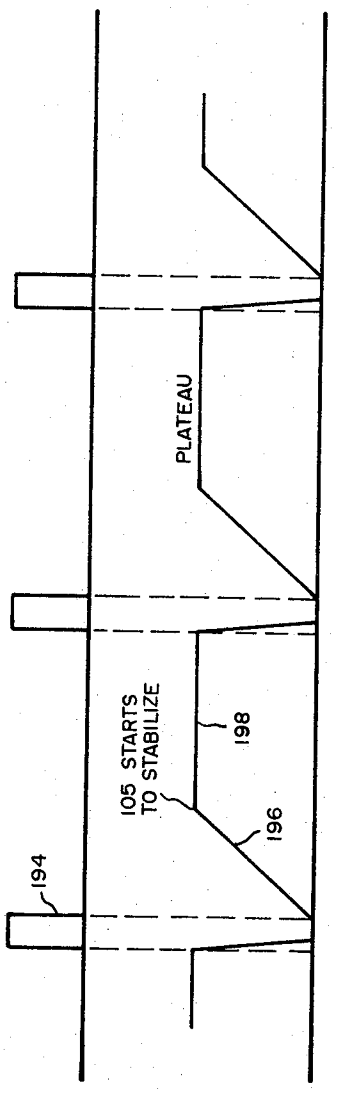
FIG. 4 is a pulse and wave form chart employed to explain a target range control portion of the invention.

Referring to FIG. 4, there is shown the delayed line pulse series 194 for a picture channel as well as the Vidicon sweep voltage 196. As can be seen from FIG. 4, the increase of sweep line voltage is limited to a plateau 198 (by limiting device 180) irrespective of the slope of the voltage which is controlled by the variable resistor 164 (i.e. tungsten cathode tube) and/or the variable capacitor 162.

The diagram for the delayed frame pulse series and the thereby controlled frame sweep voltage for the picture channels is of the same characteristics as represented and described in relation to FIG. 4. The controllable pulse delayers may be of the so-called digital delay line type as is well known in the state-of-the-art and shown in FIG. 5.

Figure 5:
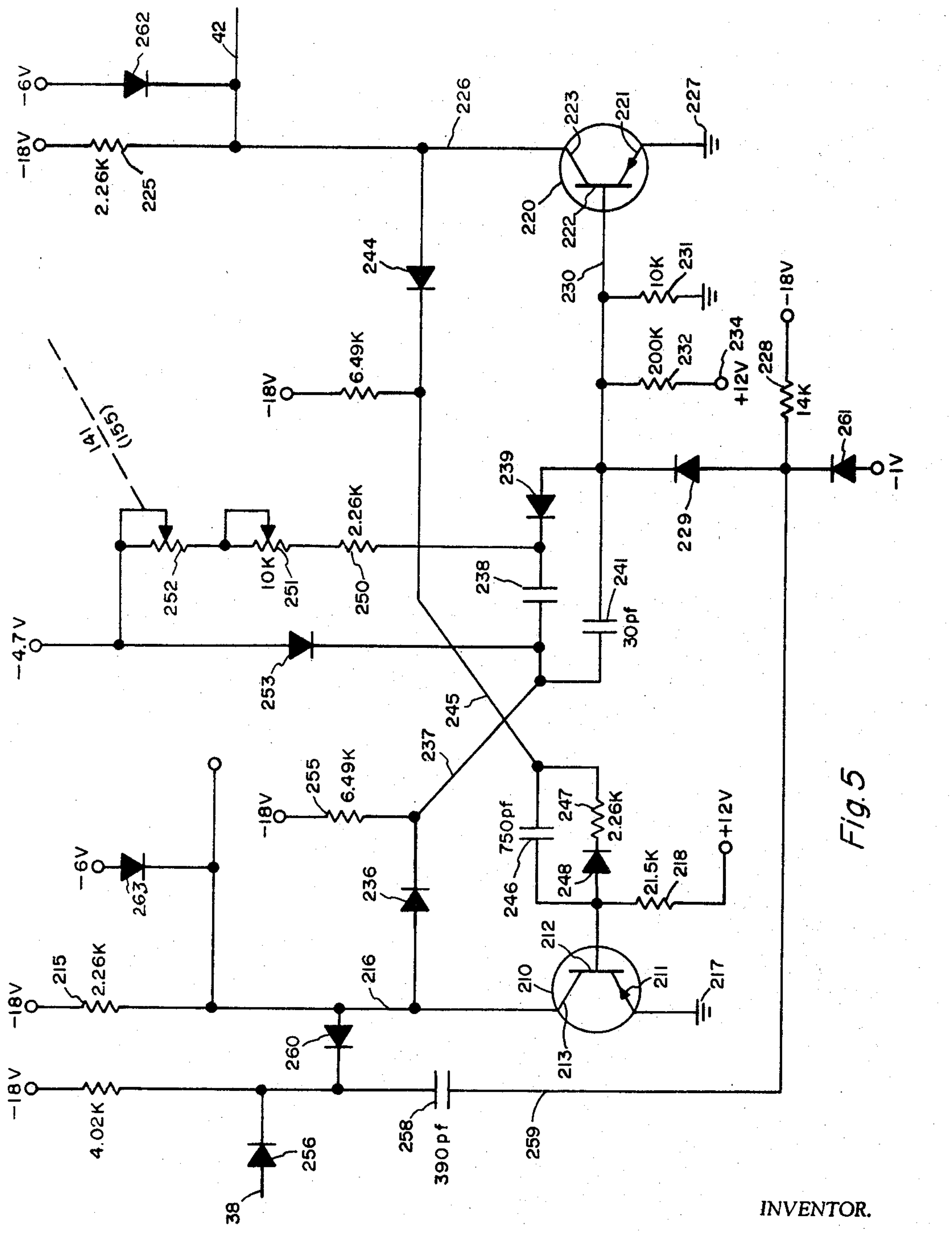
FIG. 5 is a diagram of a pulse delay circuit.

Referring now to FIG. 5, the controllable delay means 40 is seen to comprise a monostable multivibrator of a more or less conventional form which is triggered by main line sync pulses (time axis A of FIG. 3) received from generator 10 via lines 12, 36 and 38, and provides delayed line sync pulses (time axis C of FIG. 3) as an output on line 42.

The multivibrator circuit of delay means 40 comprises a first PNP transistor 210 having an emitter 211, a base 212 and a collector 213. Collector bias voltage is applied through a resistor 215 and line 216 to the collector 213. The emitter 211 is grounded at 217, while positive bias voltage is applied to base 212 through resistor 218.

A second PNP transistor 220 is provided having an emitter 221, a base 222 and a collector 223. Collector bias voltage for transistor 220 is provided through resistor 225 and line 226 to the collector 223. The emitter 221 is grounded at 227, while the base 222 is normally clamped in a forwardly biased condition by application of negative voltage through a resistor 228, diode 229 and line 230. The base 222 is further connected by a resistor 231 to ground and a resistor 232 to a source of biasing potential at 234.

The collector 213 of transistor 210 is connected by line 216, diode 236, line 237, capacitor 238, diode 239, and line 230 to the base 222 of transistor 220. A capacitor 241 is connected across capacitor 238 and diode 239.

The collector 223 of transistor 220 is connected by line 226, diode 244, line 245, and capacitor 246 in parallel with resistor 247 and diode 248 to the base 212 of transistor 210. A fixed resistor 250 is connected in series with variable resistors 251 and 252, and with a diode 253 across the capacitor 238.

When the multivibrator circuit being described is in its quiescent state transistor 210 is essentially non-conductive while transistor 220 is essentially conductive. In that state the potential of collector 213 of transistor 210 is approximately at −18 volts while the collector 223 is near ground potential, the latter being evident at the output line 42. The reverse bias provided by the voltage developed across resistor 218 maintains the transistor 210 at cut-off. The capacitor 238 is held charged at a potential of about 18 volts through a resistor 225 and the essentially shorted base emitter junction of forward-biased transistor 220.

A positive line sync pulse applied as in input at line 38 is pasesd by a clamping diode 256, a coupling capacitor 258, line 259, diode 229, and line 220, thereby reducing the forward bias and collector current thereof, and causing the potential at collector 223 to increase negatively.

The increase in negative potential at collector 223 is transmitted via diode 244, line 245 and capacitor 246, resistor 247 and diode 248 to the base 212 of transistor 210 and that transistor begins to conduct. The high negative voltage at the collector 213 of transistor 210 begins to fall (becomes more positive). This positive going voltage is coupled by capacitor 241 to the base 222 of transistor 220 resulting in regeneratively driving transistor 220 to or near cut-off and transistor 210 to or near saturation. Since capacitor 238 was initially charged to a potential almost equal to the negative 18 volts collector bias, the base of transistor 220 at cut-off is at positive potential of almost 18 volts.

Capacitor 238 then discharges through resistors 250, 251 and 252 and the low saturation resistance of transistor 210, the discharge taking place over a period of time determined by the product of the values of resistors 250, 251 and 252 and capacitor 238. During this time period, which is the period of delay introduced by the delayer means 40, the collector 223 is at a maximum negative potential level which may be taken as the time axis C of FIG. 3. The base potential of transistor 220 becomes less positive with the discharge of the capacitor 238 and, when it becomes slightly negative, transistor 220 again conducts. The potential of collector 223 increases positively and is coupled to the base of transistor 210 driving it toward cut-off. Thus, the circuit is returned to its stable condition with transisetor 210 at or near cut-off and transistor 220 at or near saturation. The sharp decrease of negative potential of collector 223 as it is driven toward saturation is represented by the leading edges of the pulses shown on time axis C of FIG. 3.

The period of delay may be varied by adjustment of the variable resistors 251, 252, the former being a calibrating resistor and the latter being the means by which the delay period is normally varied. In this regard the wiper arm of resistor 252 may be considered to be the control means 41 of FIG. 1, and it is so indicated in FIG. 5. this wiper is therefore mechanically connected in the present example by means 141 to the previously discussed switching means 98.

The various diodes, such as 229, 236, 239, 256, and 260–263, are clamping diodes and serve to prevent full cut-off and saturation of the transistors and the resultant waveform distortion. More efficient switching is thereby obtained. Such clamping is well known to those skilled in the art to which the invention pertains and need not be further described herein.

The circuit of FIG. 5, which has been described with regard to use as the variable delay means 40, may also be used as the variable delay means 54. Accordingly, the described circuit is intended to apply equally well to each of the variable delay means 40 and 54.

There has been described hereinabove in detail, the structure and function of one channel supplying electrical signals to the synthesizer system 66 which in turn, as shown in FIG. 1, is connected by line 200 to the display system 20 for the transfer of video signals. Referring again to FIG. 1, it is to be noted that several circuits of an identical nature may be provided to feed the synthesizer system 66 through several electronic cameras. To avoid complication of the drawings and since these systems are identical, the remaining channel systems are indicated in block form. Thus, for example, the equipment within the dotted outline 202 is shown in block form for the additional channels as blocks 202 *a*, 202*b*, and 202*c*. Correspondingly, the sync pulse delayers 40 and 54 are multiplicated by sync pulse delayers 40*a*, 54*a*, 40*b*, 54*b*, 40*c*, 54*c* as indicated. The electronic camera 48 as well as the switching systems 98 and 100 are multiplicated for the remaining channels as indicated at 48*a*, *b* and *c*, 98*a*, *b* and *c*, and 100*a*, *b* and *c*, and the sync pulse delayers are multiplicated as indicated at 40*a*, *b* and *c* and 54*a*, *b* and *c*.

Obviously many modifications and variations of the present invention are posisble in the light of the above teachings. It is therefore to be understood that within the scope of the appended claims the invention may be practiced otherwise than as specifically described.

It is claimed:

1. In an electronic picture synthesizer circuit of the type including a plurality of electronic cameras, one for each channel, for taking several independent pictures, a display system of the horizontal and vertical sweep scanning type and a synthesized system responsive to electrical signals from the cameras to actuate the display system to produce a composite picture, an improved apparent target motion control circuit comprising (a) a line sync pulse generator and main line sweep voltage generator connected in series to the display system to provide horizontal scan, (b) a frame sync pulse generator and main line frame sweep voltage generator connected in series to the display system to provide vertical scan, means providing individually for each camera controlled sync pulses derived from said sync pulse generators feeding the display system comprising (c) a first sync pulse delayer and line sweep voltage generator for each camera connected in series between said line sync pulse generator and an associated one of said cameras, (d) a second sync pulse delayer and frame sweep voltage generator connected in series between said frame sync pulse generator and said associated one of said cameras, and signal monitoring means for selectively passing and inhibiting the passage of video signals from each of said cameras through the synthesized to the display system, (e) said monitoring means comprising for each channel two control circuits, each including a pair of flip-flops circuits connected respectively one pair to said line pulse sync generator and to said first sync pulse delayer and the other pair to frame sync pulse generator and to said second sync pulse delayer, and (f) switching means for each control circuit and connected between its flip-flop circuit and said synthesizer to control the picture motion from center to right or left and/or up or down depending upon the selected inhibitions or released pulses.

2. An improved motion control circuit according to claim 1, and wherein (a) said first and second sync pulse delayers each comprise a variable multivibrator circuit and adjustable control means therefor, and (b) said switching means includes a plurality of single-pole double-throw switch means connected for gang operation in response to operation of said adjustable control means.

3. An improved motion control circuit according to claim 1, including (a) manually variable charging capacitor circuit means and discharge circuit means connected in each channel between its line sweep voltage generator and its frame sweep voltage generator to vary uniformly the slope of line sweep and frame sweep voltages to thereby provide control of apparent range.

4. An improved motion control circuit according to claim 3, including (a) AND and OR gate means connected to each pair of said flip-flop circuits and to its associated switching means to provide a smooth transition during change in picture movement from upward to downward and vice versa, and from left to right motion and vice versa.

5. An improved motion control circuit according to claim 1, including (a) AND and OR gate means connected to each pair of flip-flop circuits and to its associated switching means to provide a smooth transition during change in picture movement from upward to downward and from left to right motion.

6. An improved motion control circuit according to claim 1, including (a) a fixed pulse delay means connected between said line sync pulse generator and said main line sweep voltage generator to delay the main line sync pulse by a full period, and (b) a fixed pulse delay means connected between said main line frame sync pulse generator and said main line frame sweep generator to delay the main frame sync pulse by a full period to position the channel pictures centered when the pulse delayers have delayed the pulse by a line length and a frame length.

7. An improved motion control circuit according to claim 6, including (a) manually variable charging capacitor circuit means and discharge circuit means connected in each channel between its line sweep voltage generator and its frame sweep voltage generator to vary uniformly the slope of line sweep and frame sweep voltages to thereby provide control of apparent range.

8. An improved motion control circuit according to claim 7, including (a) manually variable changing capacitor circuit means and discharge circuit means connected in each channel between its line sweep voltage generator and its frame sweep voltage generator to vary uniformly the slope of line sweep and frame sweep voltages to thereby provide control of apparent range.

References Cited

UNITED STATES PATENTS 3,235,662 2/1966 Bopp ------------- 178—69.5

ROBERT L. GRIFFIN, *Primary Examiner.*

R. L. RICHARDSON, *Assistant Examiner.*

U.S. Cl. X.R.

178—6.8